(12) United States Patent
Hayes et al.

(10) Patent No.: US 7,759,414 B2
(45) Date of Patent: Jul. 20, 2010

(54) NANOPARTICULATE SOLAR CONTROL COMPOSITIONS

(75) Inventors: Richard A. Hayes, Brentwood, TN (US); Thomas R. Phillips, Vienna, WV (US); Lee A. Silverman, Newark, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 893 days.

(21) Appl. No.: 11/181,511

(22) Filed: Jul. 14, 2005

(65) Prior Publication Data

US 2010/0098953 A1    Apr. 22, 2010

(51) Int. Cl.
  $C08J\ 3/22$    (2006.01)
  $C08K\ 3/28$    (2006.01)
  $C08K\ 3/38$    (2006.01)
  $B32B\ 17/10$   (2006.01)

(52) U.S. Cl. .................. 523/351; 428/323; 428/328; 428/437; 428/441; 428/442; 524/404; 524/405; 524/409; 524/414; 524/422; 524/428; 524/430; 524/434

(58) Field of Classification Search .............. 428/437, 428/442, 323, 328, 441; 523/351; 524/404, 524/405, 409, 414, 422, 428, 430, 434
See application file for complete search history.

(56) References Cited

U.S. PATENT DOCUMENTS

| | | | |
|---|---|---|---|
| 3,344,014 A | 9/1967 | Rees | |
| 3,762,988 A | 10/1973 | Clock et al. | |
| 4,668,574 A * | 5/1987 | Bolton et al. | 428/339 |
| 4,738,798 A | 4/1988 | Mahler | |
| 5,344,513 A | 9/1994 | Takenaka | |
| 5,518,810 A | 5/1996 | Nishihara et al. | |
| 5,759,698 A | 6/1998 | Tanuma et al. | |
| 5,763,062 A | 6/1998 | Smith et al. | |
| 5,830,568 A | 11/1998 | Kondo | |
| 6,187,845 B1 * | 2/2001 | Renz et al. | 524/91 |
| 6,238,801 B1 | 5/2001 | Naoumenko et al. | |
| 6,265,054 B1 | 7/2001 | Bravet et al. | |
| 6,315,848 B1 | 11/2001 | Kondo | |
| 6,329,061 B2 | 12/2001 | Kondo | |
| 6,432,522 B1 | 8/2002 | Friedman et al. | |
| 6,506,487 B2 | 1/2003 | Nagai | |
| 6,528,572 B1 * | 3/2003 | Patel et al. | 524/495 |
| 6,579,608 B1 | 6/2003 | Kondo | |
| 6,620,477 B2 | 9/2003 | Nagai | |
| 6,632,274 B2 | 10/2003 | Kawamoto et al. | |
| 6,673,456 B1 | 1/2004 | Kobata et al. | |
| 6,686,032 B1 | 2/2004 | Nagai | |
| 6,733,872 B2 | 5/2004 | Nagai | |
| 6,911,254 B2 * | 6/2005 | Fisher et al. | 428/328 |
| 2004/0028920 A1 | 2/2004 | Fujita et al. | |
| 2004/0106703 A1 * | 6/2004 | Etzrodt et al. | 523/330 |
| 2006/0269739 A1 | 11/2006 | Phillips et al. | |

FOREIGN PATENT DOCUMENTS

| | | |
|---|---|---|
| EP | 1 227 070 A1 | 7/2002 |
| EP | 1 235 683 B1 | 8/2003 |
| EP | 1 529 632 A1 | 5/2005 |
| EP | 1 640 348 A1 | 3/2006 |
| EP | 1 008 564 B1 | 4/2006 |
| JP | 2003/268164 A | 9/2003 |
| WO | WO 91/01880 | 2/1991 |
| WO | WO 99/58334 | 11/1999 |
| WO | WO 01/00404 A1 | 1/2001 |
| WO | WO 01/60604 A1 | 8/2001 |
| WO | WO 02/060988 A1 | 8/2002 |
| WO | WO 03/057478 A1 | 7/2003 |

OTHER PUBLICATIONS

PCT International Search Report and Written Opinion for International Application No. PCT/US2006/026876 dated Aug. 16, 2007.

* cited by examiner

*Primary Examiner*—D. S Nakarani
(74) *Attorney, Agent, or Firm*—Maria M. Kourtakis; Kelly Law Registry

(57) ABSTRACT

Provided are compositions comprising infrared absorptive inorganic nanoparticles and an ethylene copolymer, and methods to produce the compositions. The infrared absorptive inorganic nanoparticles preferably include antimony tin oxide (ATO), indium tin oxide (ITO), lanthanum hexaboride ($LaB_6$), or mixtures thereof. Also provided are polymer blends, polymeric films and sheets, solar control laminates, and processes to produce the polymer blends, polymeric films and sheets and solar control laminates.

31 Claims, No Drawings

NANOPARTICULATE SOLAR CONTROL COMPOSITIONS

BACKGROUND OF THE INVENTION

1. Field of the Invention

The present invention pertains to the field of materials that reduce the transmission of radiation, and particularly to blends of polymeric and inorganic materials that reduce the transmission of infrared light.

2. Description of the Related Art

Several patents and publications are cited in this description in order to more fully describe the state of the art to which this invention pertains. The entire disclosure of each of these patents and publications is incorporated by reference herein.

Glass laminated products or "safety glass" have contributed to society for almost a century. Safety glass is characterized by high impact and penetration resistance, and by minimal scattering of glass shards and debris upon shattering. The laminates typically consist of a sandwich of an interlayer that is a polymeric film or sheet, and that is placed between two glass sheets or panels. One or both of the glass sheets may be replaced with optically clear rigid polymeric sheets such as, for example, sheets of polycarbonate materials. Safety glass has further evolved to include more than two layers of glass and/or polymeric sheets bonded together with more than one interlayer.

The interlayer is typically made with a relatively thick polymer film or sheet that exhibits toughness and adheres to the glass in the event of a crack or crash. Over the years, a wide variety of polymeric interlayers have been developed for glass laminated products. In general, it is desirable that these polymeric interlayers possess acceptable levels of: optical clarity, haze of less than 4%, impact resistance, penetration resistance, ultraviolet light resistance, long term thermal stability, adhesion to glass and/or other rigid polymeric sheets, ultraviolet light transmittance, moisture absorption, moisture resistance, and long term weatherability, among other characteristics.

Widely used interlayer materials include complex multi-component compositions comprising polymers such as: polyvinylbutyral (PVB); polyurethane (PU); polyvinylchloride (PVC); metallocene-catalyzed linear low density polyethylenes (mPE); ethylenevinyl acetate (EVA); copolymers such as those that can be obtained by the copolymerization ethylene with an $\alpha,\beta$-unsaturated carboxylic acid and/or salt thereof (hereinafter ethylene acid copolymer ionomers); polymeric fatty acid polyamides; polyester resins such as poly(ethylene terephthalate) (PET); silicone elastomers; epoxy resins; elastomeric polycarbonates; and the like. Acid copolymers have become more widespread in their use for fabricating transparent laminates.

Beyond the well known safety glass commonly used in automotive windshields, glass laminates are incorporated as windows into trains, airplanes, ships, and nearly every other mode of transportation. The architectural use of safety glass has also expanded rapidly in recent years, as designers incorporate more glass surfaces into buildings. In addition to their desirable aesthetic features, glass laminated products have now attained the strength required for weight bearing structures such as, for example, the glass staircases featured in many newer buildings.

The newer safety glass products are also designed to resist natural and man made disasters. For example, copolyethylene ionomer resins are materials that offer significantly higher strength or penetration resistance compared to other materials, such as polyvinyl butyral and ethylene vinyl acetate materials, that are commonly used in glass laminate interlayers. See, for example, U.S. Pat. Nos. 3,344,014 and 5,344,513. Specific examples include the recent development of the hurricane resistant glass that is now mandated in many hurricane susceptible areas, theft resistant glazings, and blast resistant glass laminated products. These products have enough strength to resist intrusion even after the frangible portion of the laminate has been broken, for example by high force winds, or by impact of flying debris, or by a criminal attempt to break into a structure.

Society continues to demand more functionality from laminated glass products beyond its optical and decorative capabilities and the safety characteristics described above. One desirable goal is the reduction of energy consumption within structures, such as automobiles or buildings, for example, through the development of solar control glazing. Because the near infrared spectrum is not sensed by the human eye, a typical approach has been to develop glass laminates that prevent a portion of solar energy from the near infrared spectrum from entering the structure. For example, the energy expended on air conditioning may be reduced, without a reduction or distortion of the transmitted visible light spectrum, in structures equipped with solar control windows that block a portion of the near infrared spectrum.

Solar control in glass laminates may be achieved through modification of the glass or of the polymeric interlayer, by the addition of further solar control layers, or combinations of these approaches. See, for example, U.S. Pat. Nos. 6,150,028 and 6,432,522 and published International Appln. Nos. WO99/58334 and WO01/60604. One form of solar control laminated glass includes metallized substrate films, such as polyester films, which have electrically conductive metal layers, such as aluminum or silver metal, typically applied through a vacuum deposition or a sputtering process. The metallized films generally reflect light of the appropriate wavelengths to provide adequate solar control properties. Metallized films, however, are commonly manufactured by vacuum deposition or sputtering processes that require a high vacuum apparatus and a precision atmosphere controlling system.

In addition to infrared light, metallized films also reflect certain radio wavelengths, thus impairing the function of radio, television, global positioning systems (GPS), automated toll collection, keyless entry, communication systems, automatic garage openers, automated teller machines, radio frequency identification (RFID), and like systems commonly used in automobiles or other structures that may be protected by solar control laminated glass. This impairment is a direct result of the metal layers being continuous and, therefore, electrically conductive.

Finally, moisture intrusion into sputtered metal coated films during and after the glass lamination process requires additional, complicated processes to allow for edge deletions from the interlayer. This forces a complication of the manufacturing processes.

A more recent trend has been the use of nanoparticles of certain metal compounds that absorb rather than reflect infrared light. To preserve the clarity and transparency of the substrate, these materials ideally have nominal particle sizes below about 200 nanometers (nm). Because these materials do not form electrically conductive films, the operation of radiation transmitting and receiving equipment located inside structures protected by this type of solar control glazing is not impeded.

Examples of infrared absorbing inorganic compounds include metal oxides and metal borides. Some infrared absorbing metal oxides that have attained commercial significance are antimony tin oxide and indium tin oxide. Several film substrates coated with antimony tin oxide and indium tin oxide have been described as solar control window coverings. See, for example, U.S. Pat. No. 5,518,810. The metal oxide particles may be adhered to windows with a thin layer of contact adhesive. See, for example, U.S. Pat. Nos. 6,191,884; 6,261,684 and 6,528,156.

Lanthanum hexaboride has also attained commercial significance. Several film substrates coated with lanthanum hexaboride have been described as solar control window coverings. See, for example, U.S. Pat. Nos. 6,221,945; 6,277,187; and 6,319,613; and European Patent No. 1 008 564. Moreover, lanthanum hexaboride has been used in combination with antimony tin oxide in a hardcoat layer of a window covering. See, for example, U.S. Pat. No. 6,663,950.

Window coverings, however, including solar control window coverings, suffer the shortcomings of being unstable to aging and environmental stresses such as cleaning, for example. Over time they may develop scratches or stress cracks on the film. They may also form bubbles or otherwise develop partial or total lack of adhesion to the window from, for example, humidity, heat or both.

Therefore, infrared absorbing inorganic nanoparticles have been incorporated into the polymeric interlayers of glass laminates. Generally, the nanoparticles are introduced into the polymeric materials as a dispersion in a vehicle such as a plasticizer, a solvent, or another liquid. Alternatively, ultrafine metal oxide particles have been introduced directly into a polymer melt at the end concentration desired for the infrared absorbing interlayer. See, for example, U.S. Pat. Nos. 5,830,568; 6,315,848; 6,329,061; 6,579,608; 6,506,487; 6,620,477; 6,686,032; 6,632,274; 6,673,456; and 6,733,872; and Internatl. Appln. Publn. No. WO 02/060988. Lanthanum hexaboride has also been dispersed in polymers. See, for example, U.S. Appln. Publn. Nos. 2004/0071957; 2004/0131845; and 2004/0028920. Polymeric dispersions of lanthanum hexaboride have also been used as glass interlayers. See, for example, U.S. Appln. Publn. No. 2004/0028920.

It remains desirable, however, to provide new materials that reduce transmission of infrared energy without impeding radio frequency transmission. It remains desirable to provide infrared blocking materials that do not require plasticizers or other ingredients, and that can be used to produce laminates having high strength and very good clarity or low haze. It also remains desirable to provide simplified processes for compounding these materials.

SUMMARY OF THE INVENTION

Accordingly, the present invention provides new materials that reduce transmission of infrared energy without impeding radio frequency transmission. No plasticizers or other ingredients are required, and the resulting laminates have high strength and very good clarity or low haze. Also provided are simplified processes for compounding these materials.

In a first aspect, then, the present invention provides a nanoparticulate solar control composition comprising infrared absorptive inorganic nanoparticles and an ethylene acid copolymer.

Also provided is a method of making the nanoparticulate solar control composition. In this method, the infrared absorptive inorganic nanoparticles are incorporated into a matrix material to form a nanoparticulate solar control concentrate. The nanoparticulate solar control concentrate is further blended with an ethylene acid copolymer to form a nanoparticulate solar control composition of the invention.

In another aspect, the invention provides shaped articles such as sheets, films, and solar control laminates comprising the nanoparticulate solar control composition.

DETAILED DESCRIPTION OF THE INVENTION

The definitions herein apply to the terms as used throughout this specification, unless otherwise limited in specific instances.

The term "nanoparticles", as used hereinafter, refers to infrared absorptive inorganic nanoparticles.

The term "solar control", as used herein, refers to reducing the intensity of any wavelength of light emitted by the sun. Preferably, in present invention, the intensity of an infrared or near infrared wavelength is reduced. Also preferably, the intensity of visible wavelengths is substantially unchanged. Advantageously, under these two preferred conditions, the transmission of heat is reduced, while visual transparency is maintained and the appearance of colored objects is not substantially distorted.

The term "(meth)acrylic acid", as used herein, refers to acrylic acid or methacrylic acid, or to a mixture of acrylic acid and methacrylic acid. Likewise, the term "(meth)acrylate", as used herein, refers to a salt or ester of acrylic acid, methacrylic acid, or a mixture of acrylic acid and methacrylic acid.

The terms "finite amount" and "finite value", as used herein, refer to an amount or value that is not equal to zero.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors that will be apparent to those of skill in the art. In general, an amount, size, formulation, parameter or other quantity or characteristic is "about" or "approximate" whether or not expressly stated to be such.

In one aspect, the present invention provides nanoparticulate solar control compositions comprising infrared absorptive inorganic nanoparticles and an ethylene acid copolymer.

Suitable nanoparticles have a nominal or average particle size of less than about 200 nanometers (nm). Preferably, the nanoparticles have a nominal particle size of less than about 100 nm. More preferably, the nanoparticles have a nominal particle size of less than about 50 nm. Still more preferably, the nanoparticles have a nominal particle size of less than about 30 nm. Still more preferably, the nanoparticles have a nominal particle size within the range of about 1 nm to about 20 nm.

The infrared inorganic absorptive nanoparticles preferably comprise a metal, a metal containing compound, a metal containing composite, or a mixture of two or more substances selected from metals, metal containing compounds, and metal containing composites. Suitable metals include, without limitation, tin, zinc, zirconium, iron, chromium, cobalt, cerium, indium, nickel, silver, copper, platinum, manganese, tantalum, tungsten, vanadium, antimony, molybdenum, lanthanides, and actinides. Suitable metal containing compounds include, without limitation, metal borides, metal oxides, metal nitrides, metal oxynitrides, metal phosphates, and metal sulfides. Suitable metal containing composites include metals doped with at least one doping substance and metal containing compounds doped with at least one doping substance. Suitable doping substances include, without limitation, antimony, antimony compounds, fluorine, fluorine compounds, tin, tin compounds, titanium, titanium compounds, silicon, silicon compounds, aluminum and aluminum compounds.

One preferred class of infrared inorganic absorptive nanoparticles are nanoparticles comprising metal borides. Preferred metal borides include, without limitation, lanthanum hexaboride ($LaB_6$), praseodymium hexaboride ($PrB_6$), neodymium hexaboride ($NdB_6$), cerium hexaboride ($CeB_6$), gadolinium hexaboride ($GdB_6$), terbium hexaboride ($TbB_6$), dysprosium hexaboride ($DyB_6$), holmium hexaboride ($HoB_6$), yttrium hexaboride ($YB_6$), samarium hexaboride ($SmB_6$), europium hexaboride ($EuB_6$), erbium hexaboride ($ErB_6$), thulium hexaboride ($TmB_6$), ytterbium hexaboride ($YbB_6$), lutetium hexaboride ($LuB_6$), strontium hexaboride ($SrB_6$), calcium hexaboride ($CaB_6$), titanium boride ($TiB_2$), zirconium boride ($ZrB_2$), hafnium boride ($HfB_2$), vanadium boride ($VB_2$), tantalum boride ($TaB_2$), chromium borides ($CrB$ and $CrB_2$), molybdenum borides ($MoB_2$, $Mo_2B_5$ and $MoB$) and tungsten boride ($W_2B_5$), and the like and mixtures thereof.

More preferably, the nanoparticles comprise antimony tin oxide (ATO), indium tin oxide (ITO), lanthanum hexaboride ($LaB_6$), or mixtures of two or more of ATO, ITO, or $LaB_6$. Still more preferably, the nanoparticles consist essentially of ATO, ITO, $LaB_6$, or mixtures of two or more of ATO, ITO, or $LaB_6$.

Antimony tin oxide can be described as antimony-doped tin oxide, or as tin oxide containing a relatively small amount of antimony oxide. The antimony level is preferably in the range of about 0.1 weight percent to about 20 weight percent based on the total weight of the antimony tin oxide. More preferably, the antimony level is in the range of about 5 weight percent to about 15 weight percent based on the total weight of the antimony tin oxide. Still more preferred is tin oxide doped to a level in the range of about 8 weight percent to about 10 weight percent with antimony oxide.

Indium tin oxide, in contrast, can be described as tin-doped indium oxide, or as indium oxide containing a relatively small amount of tin oxide. The tin level is preferably in the range of from about 1 to about 15 atomic percent and more preferably from about 2 to about 12 atomic percent based on the sum of tin and indium atoms. Alternatively stated, the molar fraction of the tin content in the ITO powder, (moles Sn)/[(moles Sn)+(moles In)], is preferably from about 0.01 to about 0.15. More preferably, the molar fraction of the tin content is from about 0.02 to about 0.12.

The nanoparticles may be surface treated with, for example, a silane compound, a titanium compound or a zirconium compound, to improve properties such as water resistance, thermal oxidative stability, dispersability, and the like.

The ATO, ITO, and $LaB_6$ nanoparticles may be produced through any suitable process, including, for example, vapor phase decomposition methods, plasma vaporization methods, alkoxide decomposition methods, co-precipitation methods, hydrothermal methods, and the like.

Subject to the process considerations set forth below, the amount of nanoparticles in the nanoparticulate solar control composition may range from about 0.01 to about 50 weight percent, preferably from about 0.01 to about 10 weight percent, and more preferably from about 0.01 to about 5 weight percent, based on the total weight of the nanoparticulate solar control composition.

The nanoparticulate solar control composition of the invention also includes an ethylene acid copolymer. Suitable ethylene acid copolymers have a modulus that is greater than 20,000 psi (138 MPa). Preferably, the modulus is equal to or greater than about 25,000 psi, (173 MPa), and more preferably, the modulus is equal to or greater than about 30,000 psi, (207 MPa), as measured by ASTM Method D-638.

Also, suitable ethylene acid copolymers comprise from about 0.1 weight percent to about 30 weight percent of one or more acid comonomers, preferably from about 10 weight percent to about 25 weight percent of the acid comonomer(s), and more preferably from about 15 weight percent to about 25 weight percent of the acid comonomer(s), based on the total weight of the polymer. Those of skill in the art are aware that the level of acid comonomer(s) in an ethylene copolymer affects the copolymer's adhesion to glass.

Preferred acid comonomer(s) include, without limitation, (meth)acrylic acid, itaconic acid, maleic acid, maleic anhydride, fumaric acid, and monomethyl maleic acid. More preferably, the acid comonomer is (meth)acrylic acid.

The acid groups of the ethylene acid copolymers are preferably at least partially neutralized with one or more metal cations. The metal cations may be monovalent, divalent, trivalent, or of even higher valence. Preferred monovalent ions include ions of sodium, potassium, lithium, silver, mercury, and copper. Preferred divalent ions include ions of beryllium, magnesium, calcium, strontium, barium, copper, cadmium, mercury, tin, lead, iron, cobalt, nickel, and zinc. Preferred trivalent ions include ions of aluminum, scandium, iron, and yttrium. Preferred ions of even higher valence include ions of titanium, zirconium, hafnium, vanadium, tantalum, tungsten, chromium, cerium, and iron. Preferably, when the metal cation is tetravalent or of higher valence, complexing agents, such as stearate, oleate, salicylate, and phenolate groups are included, as described in U.S. Pat. No. 3,404,134. Ions of sodium, lithium, magnesium, zinc, aluminum, and combinations of two or more of sodium, lithium, magnesium, zinc, and aluminum are more preferred. Sodium ions, zinc ions, and mixtures of sodium and zinc ions are still more preferred. Generally, sodium ions are associated with high optical clarity, and zinc ions are associated with high moisture resistance. Preferably, from about 0 to about 100 percent, more preferably from about 10 to about 100 percent, and still more preferably from about 20 to about 80 percent of the acid groups in the ethylene copolymers are neutralized.

The ethylene acid copolymers may optionally contain other comonomers. Preferred comonomers include alkyl (meth)acrylates, wherein the alkyl group is a branched or unbranched moiety including up to about 20 carbons. The alkyl groups may be unsubstituted, or substituted with one or more hydroxyl groups. Preferred alkyl groups include methyl, ethyl, propyl, isopropyl, butyl, isobutyl, tert-butyl acrylate, tert-butyl, octyl, undecyl, octadecyl, dodecyl, 2-ethylhexyl, isobornyl, lauryl, 2-hydroxyethyl acrylate, 2-hydroxyethyl. Other preferred comonomers include, without limitation, glycidyl(meth)acrylate, poly(ethylene glycol) (meth)acrylate, poly(ethylene glycol)methyl ether(meth) acrylate, poly(ethylene glycol)behenyl ether(meth)acrylate, poly(ethylene glycol) 4-nonylphenyl ether(meth)acrylate, poly(ethylene glycol)phenyl ether(meth)acrylate, dialkyl maleate (C1 to C4 alkyl), dialkyl fumarate (C1 to C4 alkyl), dimenthyl fumarate, vinyl acetate, vinyl propionate, and the like, and mixtures thereof. More preferred comonomers include, without limitation, methyl(meth)acrylate, butyl (meth)acrylate, glycidyl(meth)acrylate, vinyl acetate, and mixtures of two or more of methyl(meth)acrylate, butyl (meth)acrylate, glycidyl(meth)acrylate, and vinyl acetate.

Provided that the ethylene acid copolymer maintains a modulus of greater than 20,000 psi, the other comonomer(s) may be present in a finite amount up to about 50 weight percent, more preferably up to about 25 weight percent, and still more preferably up to about 10 weight percent, based on the total weight of the ethylene acid copolymer.

Ethylene acid copolymers suitable for use in the present invention may be polymerized and neutralized as described, for example, in U.S. Pat. Nos. 3,404,134; 5,028,674; 6,500,888; and 6,518,365. Recycled ethylene acid copolymers may also be used, together with or in place of virgin materials.

The nanoparticulate solar control composition can also include one or more plasticizers, which may be added to improve processing, final mechanical properties, or to reduce rattle or rustle of the films and sheets of the present invention. Essentially any plasticizer may find use in the present invention.

The nanoparticulate solar control composition can also include at least one dispersant. The choice of a dispersant and its concentration will depend on many factors, including the surface characteristics of the nanoparticles, the chemical nature of the ethylene copolymer, and the techniques used to mill, suspend, or disperse the nanoparticles. Essentially any dispersant may find utility within the compositions of the present invention. When used, the dispersant is preferably present in a finite amount up to about 10 weight percent, based on the total weight of the nanoparticulate solar control composition.

One or more surfactants can be included in the compositions of the invention. Suitable surfactants include anionic, nonionic and cationic surfactants. When used, the surfactant is preferably present in a finite amount up to about 5 weight percent, based on the total weight of the composition.

The nanoparticulate solar control compositions can also include one or more chelating agents such as, for example, EDTA, beta-diketones, such as acetylacetone, trifluoroacetylacetone, benzoyltrifluoroacetone, dipibaroylmethane, and the like, as disclosed in European Patent No. 1 227 070 A1. When used, the chelating agent(s) are preferably present in a finite amount up to about 2 weight percent, more preferably up to about 1 weight percent, based on the total weight of the composition.

The compositions of the present invention may incorporate an effective amount of a thermal stabilizer. Essentially any thermal stabilizer is suitable for use in the present invention. Preferred classes of thermal stabilizers include, without limitation, phenolic antioxidants, alkylated monophenols, alkylthiomethylphenols, hydroquinones, alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phosphonites, benzylphosphonates, ascorbic acid (vitamin C), compounds which destroy peroxide, hydroxylamines, nitrones, thiosynergists, benzofuranones, indolinones, and the like, and mixtures thereof. When one or more thermal stabilizers is used, the compositions of the present invention preferably incorporate a finite amount up to about 10.0 weight percent, more preferably up to about 5.0 weight percent, and still more preferably up to about 1.0 weight percent of thermal stabilizer(s), based on the total weight of the composition.

The compositions of the present invention may incorporate an effective amount of one or more UV absorbers. Essentially any UV absorber is suitable for use in the present invention. Preferred classes of UV absorbers include, without limitation, benzotriazoles, hydroxybenzophenones, hydroxyphenyl triazines, esters of substituted and unsubstituted benzoic acids, and the like, and mixtures thereof. When one or more UV absorbers is used, the compositions of the present invention preferably incorporate a finite amount up to about 10.0 weight percent, more preferably up to about 5.0 weight percent, and still more preferably up to about 1.0 weight percent of UV absorber(s), based on the total weight of the composition.

The compositions of the present invention may incorporate an effective amount of one or more hindered amine light stabilizers (HALS). Essentially any hindered amine light stabilizer is suitable for use in the present invention. Generally, hindered amine light stabilizers are secondary or tertiary, acetylated, N-hydrocarbyloxy substituted, hydroxy substituted N-hydrocarbyloxy substituted, or other substituted cyclic amines that further incorporate steric hindrance, typically derived from aliphatic substitution on the carbon atoms adjacent to the amine function. When one or more hindered amine light stabilizers are used, the compositions of the present invention preferably incorporate a finite amount up to about 10.0 weight percent, more preferably up to about 5.0 weight percent, and still more preferably, up to about 1.0 weight percent of hindered amine light stabilizer(s), based on the total weight of the composition.

The nanoparticulate solar control compositions may further incorporate one or more additives that reduce a polymer's melt flow. Advantageously, polymeric materials including these additives may serve as fire retardant interlayers, because the reduced tendency to melt and flow out of laminates provides less accessible fuel for a fire. Concomitantly, these additives increase the upper limit of temperature at to which the compositions of present invention are useful, typically by about 20 to 70° C. Specific examples of melt flow reducing additives include, without limitation, organic peroxides, such as 2,5-dimethylhexane-2,5-dihydroperoxide, 2,5-dimethyl-2,5-di(tert-betylperoxy)hexane-3, di-tert-butyl peroxide, tert-butylcumyl peroxide, 2,5-dimethyl-2,5-di(tert-butylperoxy)hexane, dicumyl peroxide, alpha, alpha'-bis (tert-butylperoxyisopropyl)benzene, n-butyl-4,4-bis(tert-butylperoxy)valerate, 2,2-bis(tert-butylperoxy)butane, 1,1-bis (tert-butyl-peroxy)cyclohexane, 1,1-bis(tert-butylperoxy)-3, 3,5-trimethyl-cyclohexane, tert-butyl peroxybenzoate, benzoyl peroxide, and the like and mixtures combinations thereof. Preferably, the organic peroxide decomposes at a temperature of about 100° C. or higher to generate radicals. More preferably, the organic peroxides have a decomposition temperature that affords a half life of 10 hours at about 70° C. or higher, to provide improved stability for blending operations. The organic peroxide(s) may be present in a finite amount up to about 10 weight percent, based on the total weight of the nanoparticulate solar control composition.

One or more initiators, such as dibutyltin dilaurate, may be used in conjunction with the organic peroxides. The initiator (s), when present, are added in a finite amount up to about 0.05 weight percent based on the total weight of the ethylene copolymer composition. One or more inhibitors, such as hydroquinone, hydroquinone monomethyl ether, p-benzoquinone, and methylhydroquinone, may also be added in conjunction with the organic peroxides to enhance reaction control and stability. The inhibitor(s) may be added at a level of less than about 5 weight percent based on the total weight of the ethylene copolymer composition.

The nanoparticulate solar control composition may also comprise coupling agents of the silane, titanium, aluminum, zirconium or magnesium types. Silane type coupling agents are preferred. Specific examples of the useful silane coupling agents include, without limitation, gamma-chloropropylmethoxysilane, vinyltrichlorosilane, vinyltriethoxysilane, vinyltris(beta-methoxyethoxy)silane, gamma-methacryloxypropyltrimethoxysilane, beta-(3,4-epoxycyclohexyl) ethyltrimethoxysilane, gammaglycidoxypropyltrimethoxysilane, vinyltriacetoxysilane, gamma-mercaptopropyltrimethoxysilane, gamma-aminopropyltriethoxysilane, N-beta-(aminoethyl)-gamma-aminopropyltrimethoxysilane, and the like and combinations thereof. Typically, when present, the silane coupling agent(s) are present in a finite amount up to about 5 weight percent, based on the total weight of the nanoparticulate solar control composition.

The nanoparticulate solar control composition may optionally include other ingredients, such as, for example, processing aides, flow enhancing additives, lubricants, pigments, dyes, flame retardants, impact modifiers, nucleating agents to increase crystallinity, antiblocking agents such as silica, UV stabilizers, adhesives, primers, colorants such as bluing agents, crosslinking agents, hardening agents, pH adjusting agents, antifoaming agents, wetting agents, antioxidants, slip agents, liquid elastomers, such as an isoprene-butadiene-isoprene resin commercially available from the Mobil Chemical Company under the trade name RMR™, and the like. Suitable levels of these additives and methods of incorporating the additives into polymer compositions will be available to those of skill in the art. See, for example, "Modern Plastics Encyclopedia", McGraw-Hill, New York, N.Y. 1995.

The process to produce the nanoparticulate solar control composition includes the steps of combining the ethylene acid copolymer with the nanoparticles and optionally other ingredients and mixing the combined ingredients.

Preferably, the nanoparticles are dispersed in the ethylene acid copolymer. Dispersion, the process of deagglomerating the as-supplied nanoparticles to primary particles, may be accomplished by any suitable means. The clarity of the articles containing the nanoparticles, as demonstrated through haze measurements, for example, will suffer if the to nanoparticles are not sufficiently deagglomerated.

Preferably, the dispersion process is a high shear melt mixing process in which the molten ethylene copolymer is combined with the nanoparticles and any optional components of the composition that may be present. Suitable high shear mixing equipment includes static mixers, rubber mills, Brabender mixers, Buss kneaders, single screw extruders, twin screw extruders, heated or unheated two-roll mills, and the like.

The precise processing conditions will depend on the physical properties of the ethylene copolymer, however, and on the amount and type of nanoparticles and optional other ingredients to be incorporated into the ethylene copolymer. Those of skill in the art will be able to determine appropriate processing conditions and equipment. For example, International Appln. Publn. No. WO 01/00404 describes a method of dispersing nanoparticles in a polymeric material using a heated two-roll mill. This method is more preferred when the ethylene copolymer or the nanoparticulate solar control composition has a melt viscosity too high for efficient processing on other equipment, such as static mixers, rubber mills, Brabender mixers, Buss kneaders, single screw extruders, and twin screw extruders.

In addition, the level of the nanoparticles in the nanoparticulate solar control composition is a key parameter that affects the efficiency of the deagglomeration process. The melt viscosity generally increases with the level of nanoparticles, both of which are preferably sufficient to impart high shear stress during the dispersion process. Conversely, an inadequately low level of nanoparticles will not provide sufficiently high melt viscosity. As a result, the shear stress will also be inadequately low, and the as-supplied nanoparticles will not be efficiently deagglomerated to their primary particle size. It follows logically that the upper limit of the level of nanoparticles incorporated within the ethylene copolymer will be determined in part by the highest melt viscosity that can be tolerated by the selected dispersion process and equipment.

The ethylene copolymer may be dried and powdered or pelletized prior to any mixing step. The ethylene copolymer may also be mixed with the nanoparticles and the optional components in a dry blend, typically referred to as a "pellet blend" or "powder blend", for feeding into the mixing equipment. Alternatively, the ethylene copolymer, the nanoparticles and the optional components may be individually fed through two or more different feeders.

In a typical extrusion process, the ethylene copolymer, the nanoparticles, and the optional components, if present, may be fed into the back or "feed" section of the extruder. It may be advantageous, however, to feed the ethylene copolymer, the nanoparticles, and the optional components into two or more different locations of the extruder. For example, the ethylene copolymer may be fed into the back section of the extruder while the nanoparticles are fed into the front of the extruder near the die plate. The extruder temperature profile preferably allows the ethylene copolymer to melt under the processing conditions. The screw design preferably also imparts shear stress, and therefore heat, as it mixes the molten ethylene copolymer with the nanoparticles and other optional components. Preferably, the melt processing temperature of the ethylene copolymer or of the nanoparticle composition is within the range of about 50° C. to about 300° C. As noted above, however, the exact processing conditions will depend on the physical properties of the ethylene copolymer, the level of nanoparticles in the melt, and the like.

In a preferred process of the invention, a relatively large amount of nanoparticles is blended with a relatively small amount of a matrix material to form a concentrate that has a relatively high level of nanoparticles. The concentrate is blended with an ethylene copolymer, which may be the same as or different from the matrix material, to produce a solar control composition with the relatively low level of nanoparticles necessary to efficiently absorb the desired amount of infrared radiation. The suitable and preferred processing methods and conditions to form the concentrates are as set forth above with respect to processes for compounding the nanoparticulate solar control compositions. In some preferred processes, the nanoparticulate solar control composition is produced in situ in a manufacturing process. For example, the nanoparticle concentrate may be added directly, as an additive, into the production processes described below for shaped articles, such as films and sheets. Suitable and preferred processes and conditions for forming shaped articles are set forth below.

The matrix material into which the nanoparticles are incorporated is preferably a polymer. Essentially any polymer may find utility as the matrix material. Preferably, the matrix material is transparent to visible light. Preferred polymeric matrix materials include, without limitation, poly(ethylene terephthalate), polycarbonate, polypropylene, polyethylene, cyclic polyolefins, norbornene polymers, polystyrene, syndiotactic polystyrene, styrene-acrylate copolymers, acrylonitrile-styrene copolymers, poly(ethylene naphthalate), polyethersulfone, polysulfone, polyamides, including nylons, poly(urethanes), acrylics, cellulose acetates, cellulose triacetates, vinyl chloride polymers, polyvinyl fluoride, polyvinylidene fluoride, poly(ethylene-co-vinyl acetate); ethyl acrylic acetate (EM); ethyl methacrylate (EMAC); metallocene-catalyzed polyethylene; plasticized poly(vinyl chloride); ISD resins; polyurethane; acoustically modified poly(vinyl chloride), an example of which is commercially available from the Sekisui Company; plasticized poly(vinyl butyral); acoustically modified poly(vinyl butyral); ethylene acid copolymers; and the like and copolymers thereof and combinations thereof. The matrix material may comprise recycled material in addition to or instead of virgin material.

Preferably, for optimal clarity, the matrix material is equivalent to or at least miscible with the ethylene acid copolymer. However, it is contemplated that it may be advantageous to utilize a lower melting matrix material, particularly in conjunction with higher melting ethylene acid copolymers. The clarity of the final film, for example, will not be unduly harmed because of the relative thinness of the film and due to the low to level of the matrix material in the final film composition.

Again subject to processing considerations, the amount of nanoparticles incorporated in to the matrix material to form the nanoparticle concentrate may range from about 30 to about 80 weight percent, preferably from about 30 to about 50 weight percent, and more preferably from about 35 to about 45 weight percent, based on the combined weight of the nanoparticles and the matrix material.

The nanoparticle concentrate may include one or more optional additives, such as those set forth above as suitable for use in the nanoparticulate solar control compositions. The concentrations of optional additives in the nanoparticle concentrates may be the same as those in the nanoparticulate solar control compositions, or different, depending on the final concentration that is desired and on the choice of a process for compounding the nanoparticulate solar control compositions. The nanoparticulate solar control composition may include from about 0.0001 weight percent to about 75 weight percent of nanoparticle concentrate and from about 99.9999 weight percent to about 25 weight percent of the ethylene acid copolymer; preferably, from about 0.0001 weight percent to about 40 weight percent of nanoparticle concentrate and from about 99.9999 weight percent to about 60 weight percent of the ethylene acid copolymer; more preferably, from about 0.0001 weight percent to about 20 weight percent of the of nanoparticle concentrate and from about 99.9999 weight percent to about 80 weight percent of the ethylene acid copolymer; and still more preferably, from about 0.0001 weight percent to about 10 weight percent of the of nanoparticle concentrate and from about 99.9999 weight percent to about 90 weight percent of the ethylene acid copolymer.

The process to produce the nanoparticulate solar control compositions from the nanoparticle concentrates is preferably performed by a high shear melt mixing process. Preferably, such a process involves high shear mixing of the molten ethylene copolymer resin with the nanoparticle concentrate and the optional components, if present. The nanoparticle concentrate may optionally be dried and powdered or pelletized prior to any mixing step. In the mixing steps, the nanoparticle concentrate may be handled in any manner that is also suitable for the ethylene copolymer. In other respects, the suitable and preferred processing conditions are as set forth above.

Preferably, a nanoparticle concentrate in a matrix material is blended with an ethylene acid copolymer as part of one of the film or sheet formation processes described below.

Alternatively, the infrared inorganic absorptive nanoparticles may be added to a plasticizer, or, alternatively, a solvent, at a level of about 0.01 to about 80 weight percent. Preferably, the nanoparticles are deagglomerated through processes that use equipment such as an attrition mill, a sand mill, a ball mill, a vibration mill, a jet mill, an atomizer deagglomerator, a three-roll mill and the like. The resulting suspension or dispersion may then be added to the ethylene acid copolymer, preferably in a high shear melt mixing process. Preferred processing conditions are as set forth above.

Also provided herein are films and sheets that comprise the nanoparticulate solar control compositions of the invention. In these films and sheets, the suitable and preferred compositions are as set forth above for the nanoparticulate solar control compositions. Generally, however, the films will include higher concentrations of the nanoparticles than the sheets, because approximately the same level of energy absorption is desired in most applications, and films are thinner than sheets.

The difference between a film and a sheet is the thickness; however, there is no set industry standard as to when a film becomes a sheet. For purposes of this invention, a polymeric film has a thickness of about 10 mils (0.25 mm), or less; preferably about 0.5 mils (0.012 mm) to about 10 mils (0.25 mm); more preferably about 1 mil (0.025 mm) to about 5 mils (0.13 mm). For automobile windshields, the polymeric film thickness may be preferably within the range of about 1 mil (0.025 mm) to about 4 mils (0.1 mm).

The polymeric sheets of the present invention have a thickness of to greater than about 10 mils (0.25 mm); preferably greater than about 15 mils (0.38 mm); more preferably greater than about 30 mils (0.75 mm); and still more preferably, greater than about 50 mils (1.25 mm), based on concurrently increasing penetration strength of the laminates produced from the polymeric sheets. High penetration strength is a desirable feature in applications that require resistance to extraordinary physical insults, such as those resulting from hurricanes and attempted security breaches. Interlayers thicker than 60 mils (1.50 mm), 90 mils (2.25 mm), and even thicker than 120 mils (3.00 mm), are now commercially available.

Films and sheets of the invention may be made by any suitable process. For example, thin films may be formed by dipcoating as described in U.S. Pat. No. 4,372,311, by compression molding as described in U.S. Pat. No. 4,427,614, by melt extrusion as described in U.S. Pat. No. 4,880,592, by melt blowing as described in U.S. Pat. No. 5,525,281, or by other suitable processes. Polymeric sheets may be formed by extrusion, calendering, solution casting or injection molding, for example. One of ordinary skill in the art will be able to identify appropriate process parameters based on the polymeric composition and on the method used for sheet or film formation.

Preferably, however, the films of the present invention are formed by solution casting or extrusion, and the sheets of the present invention are formed by extrusion. Extrusion is a particularly preferred method of forming long, continuous products, such as films and sheets.

When a melt processing method, such as extrusion or injection molding, is used, the melt processing temperature of the nanoparticulate solar control compositions is preferably from about 50° C. to about 300° C., and more preferably from about 100° C. to about 250° C. The nanoparticulate solar control compositions of the invention are generally characterized by excellent thermal stability, which allows them to be processed at high temperatures that reduce the effective melt viscosity.

The sheets and films of the invention include multilayer laminates having two or more layers, at least one of which comprises nanoparticles. The multilayer film and sheet structures may be formed by any suitable means, such as, for example, coextrusion, blown film, dipcoating, solution coating, blade, puddle, air-knife, printing, Dahlgren, gravure, powder coating, spraying, or other art processes. The individual layers may be joined together by heat, adhesive and/or tie layer, for example. Preferably, the multilayer films are produced through extrusion casting processes.

Many film and sheet formation methods, and extrusion processes in particular, can also be combined with a variety of post-extruding operations for expanded versatility. Such post-forming operations include altering round to oval shapes, blowing the film to different dimensions, machining, punching, stretching or orienting, rolling, calendering, coating, embossing, printing, radiation such as E-beam treatment to increase the Vicat softening point, and the like. The post extruding operations, together with the polymeric composition, the method of forming the polymer, and the method of forming the film or sheet, affect many properties, such as clarity, shrinkage, tensile strength, elongation at break, impact strength, dielectric strength and constant, tensile modulus, chemical resistance, melting point, heat deflection temperature, adhesion, and the like.

For example, films and sheets formed by any method may be oriented, uniaxially or biaxially, by stretching in one or both of the machine and transverse directions after formation according to any suitable methods. A biaxially oriented film may also be tensilized, that is, drawn further in the machine direction. Preferably, the drawing or stretching is conducted at a temperature of at least 10° C. above the glass transition temperature of the film material and more preferably also below the Vicat softening temperature of the film material, still more preferably at least 10° C. below the Vicat softening point.

Preferably, the shrinkage of the oriented films and sheets is controlled by heat stabilization, that is, by holding the film or sheet in a stretched position and heating for a few seconds before quenching. This stabilizes the oriented film or sheet, which then may shrink only at temperatures above the heat stabilization temperature. Preferably, the oriented films or sheets shrink less than 2 percent in both directions after 30 minutes at 150° C.

Preferably, one or both surfaces of the polymeric film or sheet is treated to enhance adhesion. This treatment may take any suitable form, including, without limitation, adhesives, primers including silanes, flame treatments, plasma treatments, electron beam treatments, oxidation treatments, corona discharge treatments, chemical treatments, chromic acid treatments, hot air treatments, ozone treatments, ultraviolet light treatments, sand blast treatments, solvent treatments, and the like, and combinations thereof. Adhesives and primers are preferred treatments for sheets.

Essentially any adhesive is suitable for use in the present invention. Specific examples of preferred adhesives include, without limitation, gamma-aminopropyl-triethoxysilane, N-beta-(aminoethyl)-gamma-aminopropyl-trimethoxysilane, and the like and mixtures thereof. Preferred adhesives that are commercially available include, for example, Silquest™ A-1100 silane, available from GE Silicones-OSi Specialties of Wilton, Conn., and believed to be gamma-aminopropyltrimethoxysilane, and Z-6020™ silane, available from the Dow Corning Corporation of Midland, Mich. The adhesives may be applied through melt processes or through coating processes, such as solution coating, emulsion coating, dispersion coating, and the like.

Likewise, essentially any primer is suitable for use in the present invention. Specific examples of preferred primers include polyallylamine-based primers, for example. One polyallylamine-based primer and its application to a poly (ethylene terephthalate)polymeric films are described in U.S. Pat. Nos. 5,411,845; 5,770,312; 5,690,994; and 5,698,329, for example. More preferably, both surfaces of the films and sheets of the invention are coated with a primer.

When using an adhesive or primer, one of ordinary skill in the art will be able to identify appropriate coating thicknesses and process parameters based on the composition of the polymer film or sheet, and of the adhesive or primer, and on the coating process.

The film or sheet may also have a hard coat layer formed from an ultraviolet (UV) curing resin on one or both surfaces to protect the outer polymeric layers from scratching, abrasion, and like insults. Any suitable hard coat formulation may be employed. One preferred hard coat is described in U.S. Pat. No. 4,027,073. The hard coat may incorporate further additives or be modified to provide other desirable attributes, such as a high scratch-resistance, for example, fine particles of $SiO_2$, $TiO_2$, $ZrO_2$, $Al_2O_3$ or MgO that do not substantially affect the transmission of visible light; antifog properties, for example hydrophilic monomers, oligomers or surfactants that can act as wetting agents; high gloss, for example ADEKA OPTMER™ KR-567 available from the Asahi Denka Kogyo K.K. Company; and moisture vapor barrier properties or resistance to polar solvents, for example, monomers, oligomers, or resins containing silicon or fluorine.

The sheets and films of the present invention may have smooth surfaces. Preferably, however, sheets to be used as interlayers within laminates have at least one roughened surface to effectively allow most of the air to be removed from between the surfaces of the laminate during the lamination process. Rough surfaces on one or both sides of the extruded sheet may be provided by the design of the die opening and the temperature of the die exit surfaces through which the extrudate passes. Roughening may also be accomplished by post-extrusion operations such as mechanically embossing the sheet after extrusion, or by melt fracture during extrusion of the sheet, and the like.

Also provided by the present invention are solar control laminates comprising at least one film or sheet of the invention. In certain preferred embodiments, the solar control laminates of the invention consist essentially of at least one nanoparticle containing film or sheet of the present invention and at least one additional layer. The additional layer may be a film or a sheet.

Preferred films for use as additional layers include, without limitation, oriented and unoriented polyester films, polycarbonate films, polyurethane films, polyvinyl chloride films, and the like. Preferably, the additional film layer is biaxially oriented poly(ethylene terephthalate). Preferred sheets for use as additional layers include, without limitation, sheets comprising polyvinyl butyral compositions, acoustic polyvinyl butyral compositions, ethylene vinyl acetate compositions, thermoplastic polyurethane compositions, polyvinyl chloride copolymer compositions, ethylene acid copolymer compositions, and the like.

Preferred rigid sheets for use as additional layers include glass, for example. The term "glass" as used herein includes window glass, plate glass, silicate glass, sheet glass, float glass, colored glass, specialty glass which may, for example, include ingredients to control solar heating, glass coated with sputtered metals such as silver, for example, glass coated with ATO and/or ITO, E-glass, Solex™ glass (available from PPG Industries of Pittsburgh, Pa.), Toroglass™, and the like. A typical glass type is 90 mil thick annealed flat glass, and it is preferable to orient the tin side of the glass to the interlayer to achieve optimal adhesion. Alternatively, the rigid sheet may be a rigid polymeric sheet, such as, for example, polycarbonate, acrylics, polyacrylate, cyclic polyolefins, such as ethylene norbornene polymers, metallocene-catalyzed polystyrene, and the like, and mixtures or combinations thereof. Preferably, the rigid sheet is transparent. A metal or ceramic plate may be used as a rigid sheet, however, if transparency or clarity is not required in the solar control laminate.

The additional layer(s) may provide additional attributes, such as acoustical barrier properties. The additional layer(s) may also have functional coatings applied to them, such as organic infrared absorbers and, in applications in which electrical conductivity may not be disadvantageous, sputtered metal layers. Those of skill in the art are aware that the hard coats, adhesives, and primers described above may also be applied to the additional layer(s), as dictated by the desired construction of the solar control laminate and the process efficiencies.

Preferred solar control laminates include structures comprising adjacent layers as follows:

polymeric film/nanoparticle containing sheet;

polymeric sheet/nanoparticle containing sheet;

polymeric film/nanoparticle containing sheet/polymeric film; and polymeric sheet/nanoparticle containing film/polymeric sheet.

rigid sheet/nanoparticle containing sheet;

rigid sheet/nanoparticle containing sheet/polymeric film;

rigid sheet/polymeric sheet/nanoparticle containing film;

rigid sheet/nanoparticle containing sheet/second rigid sheet;

rigid sheet/polymeric sheet/nanoparticle containing film/polymeric sheet/second rigid sheet;

rigid sheet/nanoparticle containing polymeric sheet/polymeric film/polymeric sheet/second rigid sheet;

rigid sheet/nanoparticle containing sheet/second rigid sheet/polymeric sheet/third rigid sheet;

rigid sheet/polymeric sheet/nanoparticle containing sheet/second polymeric sheet/second rigid sheet; and rigid sheet/polymeric sheet/nanoparticle containing sheet/polymeric film.

In each of the above embodiments, the "second" layer of any material, whether of the invention or not, may be the same as or different from the first layer of that material. Furthermore, in some more preferred embodiments, the layers of the solar control laminates are laminated directly to one another so that they are adjoining.

Any suitable process may be used to produce the solar control laminates of the present invention. Those of skill in the art are aware that different processes and conditions may be desirable, depending on the composition of the layers in the solar control laminate, and on whether a rigid or flexible laminate is desired.

For example, the sheet or film of the invention may be bonded to one or more other polymeric films or sheets in a nip roll process. In such a process, the additional layer(s) are fed along with the film or sheet of the invention through one or more calendar roll nips in which the two layers are subjected to moderate pressure and, as a result, form a weakly bonded laminate. Generally, the bonding pressure will be within the range of about 10 psi (0.7 kg/cm$^2$) to about 75 psi (5.3 kg/cm$^2$), and preferably it is within the range of about 25 psi (1.8 kg/cm$^2$) to about 30 psi (2.1 kg/cm$^2$). Typical line speeds are within the range of about 5 feet (1.5 m) to about 30 feet (9.2 m) per minute. The nip roll process may be conducted with or without moderate heating, which may be supplied by an oven or by a heated roll, for example. When heated, the polymer surfaces should achieve a temperature sufficient to promote temporary fusion bonding, that is, to cause the surfaces of the polymeric sheet or film to become tacky. Suitable surface temperatures for the preferred polymeric films and sheets of the invention are within the range of about 50° C. to about 120° C., and preferably the surface temperature is about 65° C. After fusion bonding, the laminate may be passed over one or more cooling rolls to ensure that the laminate is sufficiently strong and not tacky when taken up for storage. Process water cooling is generally sufficient to achieve this objective.

In another typical procedure to make a solar control laminate, an interlayer comprising a film or sheet of the invention is positioned between two glass plates to form a glass/interlayer/glass pre-press assembly. Preferably, the glass plates have been washed and dried. Air is drawn out from between the layers of the pre-press assembly using a vacuum bag (see, for example, U.S. Pat. No. 3,311,517), a vacuum ring, or another apparatus capable of maintaining a vacuum of approximately 27 to 28 inches (689 to 711 mm Hg). The pre-press assembly is sealed under vacuum, then placed into an autoclave for heating under pressure. With increasing order in the preference given, the temperature in the autoclave is from about 130° C. to about 180° C., from about 120° C. to about 160° C., from about 135° C. to about 160° C., or from about 145° C. to about 155° C. The pressure in the autoclave is preferably about 200 psi (15 bar). With increasing order in the preference given, the pre-press assembly is heated in the autoclave for about 10 to about 50 minutes, about 20 to about 45 minutes, about 20 to about 40 minutes, or about 25 to about 35 minutes. Following the heat and pressure cycle, the air in the autoclave is cooled without adding additional gas to maintain pressure in the autoclave. After about 20 minutes of cooling, the excess air pressure is vented and the laminates are removed from the autoclave.

Alternatively, a nip roll process may be used to produce solar control laminates. In one such process, the glass/interlayer/glass assembly is heated in an oven at or to between about 80° C. and about 120° C., preferably between about 90° C. and about 100° C., for about 30 minutes. Thereafter, the heated glass/interlayer/glass assembly is passed through a set of nip rolls so that the air in the void spaces between the glass and the interlayer is expelled. The edges of the structure are sealed at this point to produce a pre-press assembly that may be processed under vacuum in an autoclave, as described above, to produce a solar control laminate.

Solar control laminates may also be produced by non-autoclave processes. Several suitable non-autoclave processes are described in U.S. Pat. Nos. 3,234,062; 3,852,136; 4,341,576; 4,385,951; 4,398,979; 5,536,347; 5,853,516; 6,342,116; 5,415,909; in U.S. Patent Appln. Publn. No. 2004/0182493; in European Patent No. 1 235 683 B1; and in International Patent Appln. Publn. Nos. WO 91/01880 and WO 03/057478 A1, for example. Generally, non-autoclave processes include heating the pre-press assembly and the application of vacuum, pressure or both. For example, the pre-press assembly may be passed through heating ovens and nip rolls.

Also provided are articles comprising the solar control laminates of the invention. Examples of articles of the invention include, without limitation, interior and exterior glazing, such as windows and skylights, for use in architecture and in transportation vehicles, for example automobiles, airplanes, trucks, trains, and marine vessels; structural elements, such as balustrades and staircases, including their components, such as stair treads or railings; sculptures and other decorative objects; and the like. Preferred articles of the invention include glazing for any use in which increased penetration resistance is desirable, for example because of natural disasters, including earthquakes and severe weather conditions, such as tornadoes or hurricanes; or for security reasons, such as the prevention of criminal activity or damage from criminal activity, for example.

For architectural uses and for uses in transportation vehicles, a preferred solar control laminate has two layers of glass, and, directly laminated to both glass layers, a single interlayer of the present invention. In these applications, the solar control laminate preferably has an overall thickness of about 3 mm to about 30 mm. The interlayer typically has a thickness of about 0.38 mm to about 4.6 mm, and each glass layer usually is at least 1 mm thick or thicker. The interlayer of the present invention is preferably adhered directly to the glass layers; thus, the glass is adjoining the interlayer, and an adhesive is preferably not required. Also preferred are multi-layered solar control laminates, such as a five layer laminate of glass/interlayer/glass/interlayer/glass, a seven layer laminate of glass/interlayer/glass/interlayer/glass/interlayer/glass, and the like.

EXAMPLES

The examples are presented for illustrative purposes only, and are not intended to limit the scope of the present invention in any manner.

Analytical Methods

Solar control properties were measured according to ASTM test methods E424 and E308, and ISO 9050:2003 and ISO 13837 test methods, using a Perkin Elmer Lambda 19 spectrophotometer.

Materials

The indium tin oxide nanoparticles are available from the NanoPhase Technologies Company of Romeoville, Ill. under the tradename "Nanotek." This grade is believed to have a nominal particle size of 10 nm.

The poly(ethylene-co-methacrylic acid) contains 19 wt % of methacrylic acid and 37% of the acid groups are neutralized with sodium ions. Similar polymers are available from E.I. du Pont de Nemours & Co. of Wilmington, Del. under the trademark Surlyn®.

Preparative Example PE 1

Indium tin oxide (40 wt %) was mixed with polyvinyl butyral (50 wt % of a medium viscosity grade having a hydroxyl number of 18 to 18.5) and triethylene glycol bis(2-ethyl hexanoate) (10 wt %) to form a powder blend. The powder blend was subjected to high shear, intensive melt mixing on a two roll mill heated to a temperature within the range of 180° C. to 200° C. for 30 minutes. The melt was cast into slabs. The slabs were cooled to room temperature and crushed to form discrete chips.

Example 1

Pellets of poly(ethylene-co-methacrylic acid) (35.00 grams, 19 wt % methacrylic acid, 37% neutralized with sodium ions) were placed into a mixer head (Type Six Mixer with Roller Blades) attached to a Brabender Plasti-Corder™ PL2000 extruder (available from C. W. Brabender, South Hackensack, N.J.) that was preheated to 150° C. The polymer was melted in the Brabender at a screw speed of 50 rpm. After 5 minutes, the product of Preparative Example PE 1 (5.00 grams), was added and the resulting blend was melt compounded for 0.50 hours at 150° C.

The blend product produced above was pressed into 4 inch by 4 inch by 15 mil (102 mm×102 mm×0.38 mm) plaques on a melt press. The press cycle included a 3 minute heat up step at a pressure of 6000 psi, a 2 minute hold at 12,000 psi, and a 4 minute cool down at 12,000 psi. The maximum press temperature was 176° C. (as measured).

Example 2

A pellet blend of poly(ethylene-co-methacrylic acid) (92.00 grams) and the product from Example 1 (8.00 grams) was fed into a Brabender extruder, (extruder head: 25:1 L/d single screw, diameter 0.75 inch (19.05 mm)). The temperature profile in the extruder was feed zone 110° C., Section 1 200° C., Section 2 200° C., and die plate 200° C. with a screw speed of 40 rpm. The resulting compounded blend was collected and fed back through the extruder twice more under the same conditions.

The resulting product was pressed into plaques on a melt press. The sizes of the plaques were 4 inch by 4 inch by 30 mil (102 mm×102 mm×0.75 mm), 3 inch by 3 inch by 30 mil (76 mm×76 mm×0.75 mm), and 3 inch by 3 inch by 15 mil (76 mm×76 mm×0.38 mm). The press cycle included a 3 minute heat up step at a pressure of 6000 psi, a 2 minute hold at 12,000 psi and a 4 minute cool down at 12,000 psi. The maximum press temperature was 176° C. (as measured).

Comparative Example CE 1

Pellets of poly(ethylene-co-methacrylic acid) (92.00 grams) were fed to a Brabender extruder (extruder head: 25:1 L/d single screw, diameter 0.75 inch (19.05 mm)). The temperature profile in the extruder was feed zone 110° C., Section 1 200° C., Section 2 200° C., and die plate 200° C. with a screw speed of 40 rpm. The resulting compounded blend was collected and fed back through the extruder twice more under the same conditions.

The resulting product was pressed into plaques on a melt press. The sizes of the plaques were 4 inch by 4 inch by 30 mil (102 mm×102 mm×0.75 mm), 3 inch by 3 inch by 30 mil (76 mm×76 mm×0.75 mm), and 3 inch by 3 inch by 15 mil (76 mm×76 mm×0.38 mm). The press cycle included a 3 minute heat up step at a pressure of 6000 psi, a 2 minute hold at 12,000 psi and a 4 minute cool down at 12,000 psi. The maximum press temperature was 176° C. (as measured).

Comparative Example CE 2

A glass/interlayer/glass pre-press assembly including a clear annealed float glass plate layer, a plaque of Comparative Example CE 1, and a second clear annealed float glass plate layer (each 4 inches by 4 inches; glass layers 2.5 mm thick; plaque 0.75 mm thick; air side of glass in contact with the plaque interlayer) was placed in a vacuum bag and heated at 90 to 100° C. for 30 minutes, to remove any air contained between the layers of the glass/interlayer/glass assembly. The glass/interlayer/glass pre-press assembly is then heated at 135° C. for 30 minutes in an air autoclave at a pressure of 200 psig (14.3 bar). The air is then cooled without adding additional gas to maintain the pressure in the autoclave. After 20 minutes of cooling, when the air temperature is less than about 50° C., the excess pressure is vented, and the glass/interlayer/glass laminate is removed from the autoclave. The resulting laminate had a solar transmission of 70.3 and a visible light transmission of 78.2.

Example 3

A glass/interlayer/glass pre-press assembly including a clear annealed float glass plate layer, a plaque of Example 2, and a second clear annealed float glass plate layer (each 4 inches by 4 inches thick; glass 2.5 mm thick; plaque 0.75 mm thick; air side of glass in contact with the plaque interlayer) was placed in a vacuum bag and heated at 90 to 100° C. for 30 minutes, to remove any air contained between the layers of the glass/interlayer/glass assembly. The glass/interlayer/glass pre-press assembly is then heated at 135° C. for 30 minutes in an air autoclave at a pressure of 200 psig (14.3 bar). The air is then cooled without adding additional gas to maintain the pressure in the autoclave. After 20 minutes of cooling, when the air temperature is less than about 50° C., the excess pressure is vented, and the glass/interlayer/glass laminate is removed from the autoclave.

The laminate had a solar transmission of 52.0, and a visible light transmission of 68.7.

Comparative Example CE 3

A pre-press assembly including a clear annealed float glass plate layer (4 inches by 4 inches by 3 mm thick, air side of glass layer in contact with the plaque interlayer), a plaque of Comparative Example CE 1 (3 inch by 3 inch by 30 mil), a biaxially oriented poly(ethylene terephthalate) film (4 inches by 4 inches), a thin Teflon® film layer, and a second clear annealed float glass plate layer (4 inches by 4 inches by 2.5 mm thick) was placed in a vacuum bag and heated at 90 to 100° C. for 30 minutes, to remove any air contained between the layers of the assembly. The pre-press assembly is then heated at 135° C. for 30 minutes in an air autoclave at a pressure of 200 psig (14.3 bar). The air is then cooled without adding additional gas to maintain the pressure in the autoclave. After 20 minutes of cooling, when the air temperature is less than about 50° C., the excess pressure is vented, and the laminate is removed from the autoclave. The thin Teflon® film and the second glass sheet are removed to yield a glass/interlayer/biaxially oriented poly(ethylene terephthalate) film laminate.

This laminate had a solar transmission of 77.4, and a visible light transmission of 80.3.

Example 4

A pre-press assembly including a clear annealed float glass plate layer (4 inches by 4 inches by 3 mm thick, air side of glass layer in contact with the plaque interlayer), a plaque of Example 2 (3 inch by 3 inch by 30 mil), a biaxially oriented poly(ethylene terephthalate) film (4 inches by 4 inches), a thin Teflon® film layer, and a second clear annealed float glass plate layer (4 inches by 4 inches by 2.5 mm thick) was placed in a vacuum bag and heated at 90 to 100° C. for 30 minutes, to remove any air contained between the layers of the pre-press assembly. The pre-press assembly is then heated at 135° C. for 30 minutes in an air autoclave at a pressure of 200 psig (14.3 bar). The air is then cooled without adding additional gas to maintain the pressure in the autoclave. After 20 minutes of cooling, when the air temperature is less than about 50° C., the excess pressure is vented, and the laminate is removed from the autoclave. The thin Teflon® film and the second glass sheet are removed to yield a glass/interlayer/biaxially oriented poly(ethylene terephthalate) film laminate.

The laminate had a solar transmission of 57.0, and a visible light transmission of 69.7.

Comparative Example CE 4

A pre-press assembly including a Solex™ green glass plate layer (4 inches by 4 inches by 2.3 mm thick), two plaques of Comparative Example CE 1 (3 inch by 3 inch by 15 mil), and a clear annealed float glass plate layer (4 inches by 4 inches by 2.5 mm thick, air side of glass in contact with the plaque interlayer) was placed in a vacuum bag and heated at 90 to 100° C. for 30 minutes, to remove any air contained between the layers of the glass/interlayer/interlayer/glass assembly. The pre-press assembly is then heated at 135° C. for 30 minutes in an air autoclave at a pressure of 200 psig (14.3 bar). The air is then cooled without adding additional gas to maintain the pressure in the autoclave. After 20 minutes of cooling, when the air temperature is less than about 50° C., the excess pressure is vented, and the glass/interlayer/interlayer/glass laminate is removed from the autoclave.

The laminate had a solar transmission of 55.0, and a visible light transmission of 71.6.

Example 5

A pre-press assembly including a Solex™ green glass plate layer (4 inches by 4 inches by 2.3 mm thick), two plaques of Example 2 (3 inch by 3 inch by 15 mil), and a clear annealed float glass plate layer, (4 inches by 4 inches by 2.5 mm thick, air side of glass in contact with the plaque interlayer) was placed in a vacuum bag and heated at 90 to 100° C. for 30 minutes, to remove any air contained between the layers of the glass/interlayer/interlayer/glass assembly. The pre-press assembly is then heated at 135° C. for 30 minutes in an air autoclave at a pressure of 200 psig (14.3 bar). The air is then cooled without adding additional gas to maintain the pressure in the autoclave. After 20 minutes of cooling, when the air temperature is less than about 50° C., the excess pressure is vented, and the glass/interlayer/interlayer/glass laminate is removed from the autoclave.

The laminate had a solar transmission of 37.3, and a visible light transmission of 57.2.

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A method of making a nanoparticulate solar control composition comprising an ethylene acid copolymer, a second ethylene acid copolymer, and deagglomerated, dispersed nanoparticles of an inorganic infrared absorbing material, said method comprising the steps of:

combining a polymeric matrix material and agglomerated, undispersed nanoparticles of an inorganic infrared absorbing material to provide a nanoparticle concentrate consisting of the polymeric matrix material and deagglomerated, dispersed nanoparticles of the inorganic infrared absorbing material; wherein the polymeric matrix material consists of the ethylene acid copolymer; wherein the deagglomerated, dispersed inorganic infrared absorbing nanoparticles comprise one or more substances selected from the group consisting of a metal, a metal containing compound, and a metal containing composite; wherein the metal containing compound is selected from the group consisting of a metal boride, a metal oxide, a metal nitride, a metal oxynitride, a metal phosphate, and a metal sulfide; wherein the metal containing composite comprises the metal or the metal containing compound and further comprises at least one doping substance; and wherein the deagglomerated, dispersed inorganic infrared absorbing nanoparticles are present in the nanoparticle concentrate at a level of about 30 wt % to about 80 wt %, based on the total weight of the nanoparticle concentrate;

providing the second ethylene acid copolymer, which may be the same as or different from the polymeric matrix material; and combining the nanoparticulate solar control concentrate and the second ethylene acid copolymer to form the nanoparticulate solar control composition;

wherein the ethylene acid copolymer comprises one or more acid comonomers selected from the group consisting of acrylic acid, methacrylic acid, itaconic acid, maleic acid, maleic anhydride, fumaric acid, and monomethyl maleic acid.

2. The method of claim 1, wherein the inorganic infrared absorbing nanoparticles are present at a level of about 30 wt % to about 50 wt %, based on the total weight of the nanoparticle concentrate.

3. The method of claim 1, wherein the inorganic infrared absorbing nanoparticles are present at a level of about 35 wt % to about 45 wt %, based on the total weight of the nanoparticle concentrate.

4. The method of claim 1, wherein the inorganic infrared absorbing nanoparticles comprise one or more of antimony tin oxide, indium tin oxide, or lanthanum hexaboride.

5. The method of claim 1, wherein the matrix material comprises recycled ethylene acid copolymer, virgin ethylene acid copolymer, or both recycled ethylene acid copolymer and virgin ethylene acid copolymer.

6. The method of claim 1, wherein the polymeric matrix material is equivalent to or miscible with the second ethylene acid copolymer.

7. The method of claim 1, wherein the polymeric matrix material has a melting point that is lower than the melting point of the second ethylene acid copolymer.

8. The method of claim 1, wherein the nanoparticulate solar control composition comprises from about 0.0001 weight percent to about 75 weight percent of the nanoparticle concentrate and from about 99.9999 weight percent to about 25 weight percent of the second ethylene acid copolymer, based on the total weight of the nanoparticulate solar control composition.

9. The method of claim 1, wherein the nanoparticulate solar control composition comprises from about 0.0001 weight percent to about 10 weight percent of the of nanoparticle concentrate and from about 99.9999 weight percent to about 90 weight percent of the second ethylene acid copolymer, based on the total weight of the nanoparticulate solar control composition.

10. The method of claim 1, wherein the nanoparticle concentrate and the second ethylene acid copolymer are combined in an extrusion process.

11. The method of claim 1, wherein the acid groups of the ethylene acid copolymer and the second ethylene acid copolymer are at least partially neutralized with one or more metal cations.

12. A nanoparticulate solar control composition obtainable by the method of claim 1.

13. A shaped article comprising the nanoparticulate solar control composition of claim 12.

14. The shaped article of claim 13, being a nanoparticle containing film or sheet.

15. A solar control laminate comprising the nanoparticle containing film or sheet of claim 14.

16. The solar control laminate of claim 15, further comprising a first additional layer, and, optionally, a second additional layer.

17. The solar control laminate of claim 16, wherein the first additional layer or the second additional layer, or both the first and the second additional layers, further comprise a coating independently selected from the group consisting of an adhesive, a primer, and a hard coat.

18. The solar control laminate of claim 16, wherein the first additional layer is a rigid sheet.

19. The solar control laminate of claim 16, comprising the second additional layer.

20. The solar control laminate of claim 19, wherein the second additional layer is a rigid sheet.

21. The solar control laminate of claim 19, wherein the film or sheet is disposed between the first additional layer and the second additional layer.

22. The solar control laminate of claim 21, wherein the first additional layer and the second additional layer are glass.

23. The solar control laminate of claim 22, further comprising a third additional layer disposed between the first additional layer and the nanoparticle containing film or sheet.

24. The solar control laminate of claim 23, further comprising a fourth additional layer disposed between the third additional layer and the nanoparticle containing film or sheet.

25. The solar control laminate of claim 21, wherein the first additional layer is glass and the second additional layer is biaxially oriented poly(ethylene terephthalate).

26. The solar control laminate of claim 21, further comprising a third additional layer and a fourth additional layer, wherein the third additional layer is disposed between the first additional layer and the nanoparticle containing film or sheet; the fourth additional layer is disposed between the second additional layer and the nanoparticle containing film or sheet; the first and second additional layers are rigid sheets, and the third and fourth additional layers are independently selected from a film or a sheet.

27. The solar control laminate of claim 21, wherein the nanoparticle containing film or sheet and the first and second additional layers are adjoining, and further comprising a third additional layer and a fourth additional layer, wherein the third additional layer is adjoining the second additional layer and the fourth additional layer is adjoining the third additional layer, and wherein the third additional layer is a film or a sheet, and the fourth additional layer is a rigid sheet.

28. The solar control laminate of claim 19, wherein the first additional layer and the second additional layer are adjacent, and the nanoparticle containing film or sheet is adjacent to the second additional layer.

29. The solar control laminate of claim 28, wherein the first and second additional layers and the nanoparticle containing film or sheet are adjoining, wherein the first additional layer is a rigid sheet and the second additional layer is a film or a sheet, and further comprising a second nanoparticle containing film or sheet and, optionally, a third additional layer that is a rigid sheet, wherein the second nanoparticle containing film or sheet is adjoining the nanoparticle containing film or sheet and the optional third layer is adjoining the second nanoparticle containing film or sheet.

30. The solar control laminate of claim 15, having a structure selected from the group consisting of:

rigid sheet/nanoparticle containing sheet;

rigid sheet/nanoparticle containing sheet/polymeric film;

rigid sheet/polymeric sheet/nanoparticle containing film;

rigid sheet/nanoparticle containing sheet/second rigid sheet;

rigid sheet/polymeric sheet/nanoparticle containing film/polymeric sheet/second rigid sheet;

rigid sheet/nanoparticle containing polymeric sheet/polymeric film/polymeric sheet/second rigid sheet;

rigid sheet/nanoparticle containing sheet/second rigid sheet/polymeric sheet/third rigid sheet;

rigid sheet/polymeric sheet/nanoparticle containing sheet/second polymeric sheet/second rigid sheet; and rigid sheet/polymeric sheet/nanoparticle containing sheet/polymeric film.

31. An article comprising a solar control laminate of claim 15, said article selected from the group consisting of interior or exterior windows or skylights for use in architecture or in transportation vehicles; structural elements; sculptures; and decorative objects.

* * * * *